US006397148B1

(12) United States Patent
Lee

(10) Patent No.: US 6,397,148 B1
(45) Date of Patent: *May 28, 2002

(54) METHOD AND DEVICE FOR DISPLAYING ANIMATED NAVIGATION INFORMATION

(75) Inventor: Wai Lee, Olathe, KS (US)

(73) Assignee: Garmin Corporation (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/931,128

(22) Filed: Aug. 16, 2001

Related U.S. Application Data

(63) Continuation of application No. 09/501,112, filed on Feb. 9, 2000, now Pat. No. 6,317,689.

(51) Int. Cl.$^7$ ............................................... G01C 21/30

(52) U.S. Cl. .................. 701/213; 701/211; 342/257.07; 340/996; 345/473; 345/474

(58) Field of Search ................................ 701/207, 208, 701/211, 213, 1, 2; 340/990, 995, 996; 342/357.06, 357.07; 345/473, 474, 441, 442, 706; 463/30, 31, 39, 40, 43

(56) References Cited

U.S. PATENT DOCUMENTS

| 4,733,356 | A |   | 3/1988  | Haeussermann et al. .... 701/200 |
| 4,831,538 | A |   | 5/1989  | Cucchiari et al. ........... 701/200 |
| 4,843,399 | A |   | 6/1989  | Bongiorno et al. ......... 701/218 |
| 4,977,509 | A |   | 12/1990 | Pitchford et al. ........... 701/701 |
| 5,067,081 | A |   | 11/1991 | Person ....................... 701/202 |
| 5,345,244 | A |   | 9/1994  | Gildea et al. .......... 342/357.12 |
| 5,406,491 | A |   | 4/1995  | Lima .......................... 701/210 |
| 5,523,761 | A |   | 6/1996  | Gildea ................... 342/357.03 |
| 5,543,802 | A | * | 8/1996  | Villevieille et al. .... 342/357.06 |
| 5,613,055 | A |   | 3/1997  | Shimoura et al. ........... 395/173 |
| 5,738,583 | A | * | 4/1998  | Comas et al. ................. 463/40 |
| 5,806,017 | A |   | 9/1998  | Hancock ..................... 701/209 |
| 5,884,219 | A |   | 3/1999  | Curtwright et al. ......... 701/213 |
| 5,902,347 | A |   | 5/1999  | Backman et al. ........... 701/200 |
| 5,913,918 | A |   | 6/1999  | Nakano et al. ............. 701/208 |
| 5,938,721 | A |   | 8/1999  | Dussell et al. .............. 701/211 |
| 5,987,380 | A |   | 11/1999 | Backman et al. ........... 701/208 |
| 6,006,161 | A |   | 12/1999 | Katou ........................ 701/212 |
| 6,029,072 | A |   | 2/2000  | Barber ....................... 455/557 |
| 6,127,945 | A |   | 10/2000 | Mura-Smith ................ 340/988 |
| 6,192,257 | B1 |  | 2/2001  | Ray ........................... 455/566 |
| 6,317,689 | B1 | * | 11/2001 | Lee ............................ 701/213 |

* cited by examiner

Primary Examiner—Jacques H. Louis-Jacques
(74) Attorney, Agent, or Firm—Devon A. Rolf

(57) ABSTRACT

A method and device for displaying animated navigation information has a processor, a memory, a display, and an input, housed in a portable, handheld housing. In various embodiments of the present invention, a plurality of frames are stored in memory, wherein each frame includes data indicative of a still-shot of a portion of an animated sequence represented by the total plurality of frames. The processor retrieves the frames in sequence for display on the display, such that successively displaying each of the frames on the display presents a visualization on the display of animated movement. In one aspect of the invention, animation is provided upon power up of the unit to provide the user with an indication of the nature of use and features of the unit. In another aspect of the invention, animation is provided to provide an indication to the user of satellite signal acquisition for use in navigation purposes. In another aspect of the invention, a graphical menu driven system is provided, such that upon entry of menu selection, a graphical representation indicative of the selection made appears on the display screen. In accordance with another aspect, as the user of the navigation unit moves with the navigation unit on his or her person, the navigation unit tracks the movement and provides an animated, graphical representation indicative of movement of the user.

11 Claims, 4 Drawing Sheets

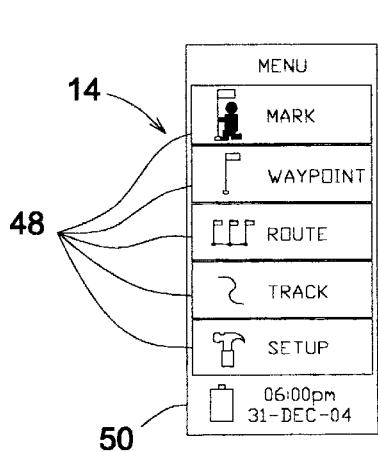
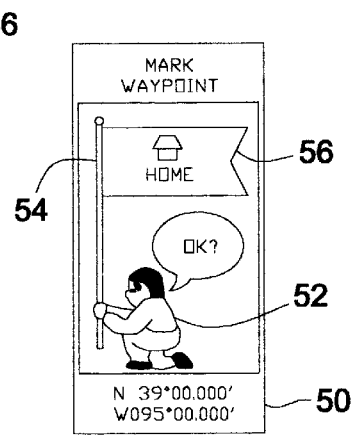
Fig. 5.    Fig. 6.
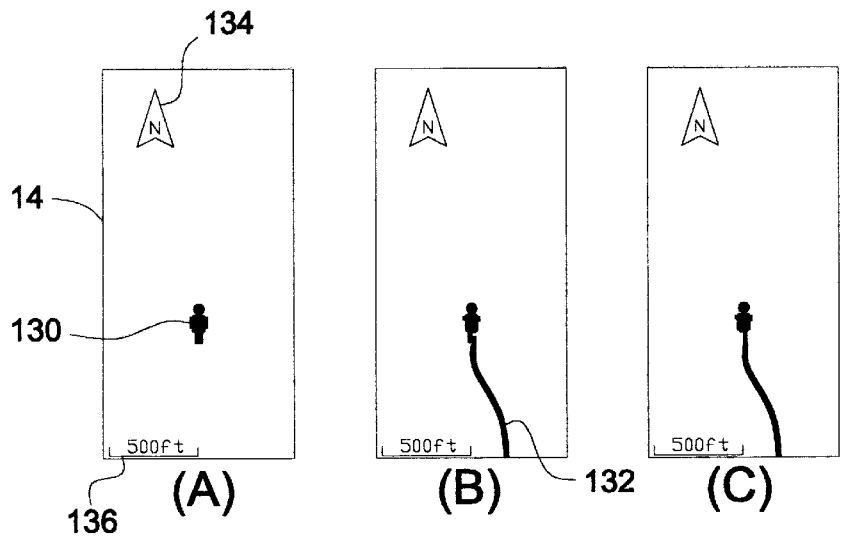
Fig. 7.
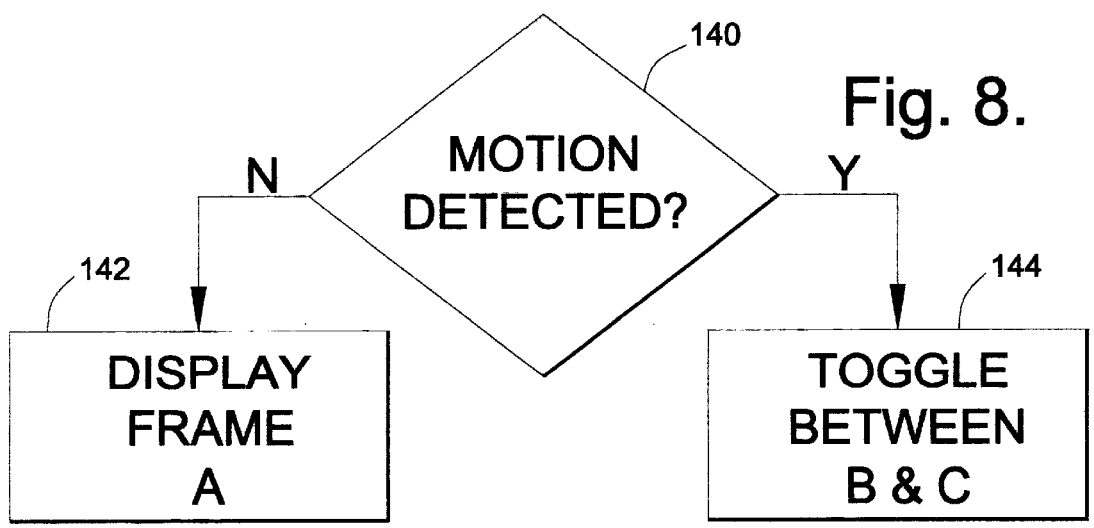
Fig. 8.

METHOD AND DEVICE FOR DISPLAYING ANIMATED NAVIGATION INFORMATION

This is a continuation of application of Ser. No. 09/501,112, filed Feb. 9, 2000, now U.S. Pat. No. 6,317,689 to the same inventor.

FIELD OF INVENTION

In general, the present invention relates to Global Positioning System (GPS) receiver units. More particularly, the present invention relates to a method and device for displaying animated navigation information on the display of a GPS receiver unit.

BACKGROUND OF THE INVENTION

Global Positioning Systems and receiver units for use in connection with GPS are well known in the prior art and have a variety of uses. Generally, GPS is a satellite based radio navigation system capable of determining continuous position and velocity information for an unlimited number of users. The GPS incorporates a plurality of satellites which orbit the Earth in highly precise orbits. GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of several different conventional methods. The device will continue scanning for signals until it has acquired at least three different satellite signals. Implementing geometrical triangulation, the receiver utilizes the three known satellite positions to determine its two dimensional position relative to the satellites. Additionally, acquiring a fourth satellite signal will allow the receiving device to calculate its three dimensional position by geometrical calculation. The positioning and velocity data can be updated in realtime on a continuous basis.

There is a need for a device that is capable of a more meaningful display of the information typically used with a GPS receiver.

SUMMARY OF THE INVENTION

The present invention satisfies the above described need and other needs by providing a GPS receiver unit that displays animated navigation information. The invention utilizes animation to provide immediate indication to the user of certain activity. Generally described, the present invention provides a GPS receiver device having an input, a processor, a memory, and a display. In one embodiment, the GPS receiver device of the present invention is a handheld device, such as may be used when hiking. Alternatively, the present invention may be a removably mounted navigation unit, or a navigational unit fixedly installed in a vehicle.

In accordance with one aspect of the invention, data indicative of an animated sequence stored in memory. In particular, a number of frames of expression are stored in the memory of the GPS receiver device, such that each frame may be retrieved and output successfully on the display in a rapid manner, to visualize animation. In particular, for example, each frame in the sequence represents a moment in time as an animated character carrying a flag, walks a path, and plants the flag. It will be understood that any animated sequence may be utilized. However, in accordance with an aspect of the invention, the animation represents the type of display screen the user will see when he or she is hiking or walking, such that the animated character then corresponds to the individual user, with a trail being left behind the animated character. Preferably, this animated sequence is output to the display upon power up of the unit, thereby providing an initial indication to the user of the nature and features of the unit.

In accordance with a further aspect of the invention, upon power up, or upon following presentation of the initial animated sequence, the GPS receiver device begins to search for global positioning system satellite signals in a conventional manner. During this satellite signal acquisition stage, animation representative of the satellite signal acquisition is provided to the display. In particular, a plurality of frames, each containing data indicative of a display expression, are stored in memory. Each frame provides a screen representation on the screen display of an individual standing on a globe, with a plurality of satellites orbiting overhead. Additionally, each frame provides a first window at the top of the frame in which the text is inserted, and a second window at the bottom of the frame, for illustrating a bar indicative of the satellite signal strength. In particular, each successive frame in the sequence of frames provides a visual indication that either signals from additional satellites have been tracked or acquired. Additionally, as acquisition completes, the signal strength bar grows visually larger. Furthermore, for example, text may be provided in the upper window to indicate that satellites are being tracked until such time as the appropriate number of satellite signals have been acquired, at which time text is provided in the upper window to indicate that the unit is ready to navigate.

In a further aspect of the invention, the device includes a menu that is stored in the memory, wherein the menu displays a plurality of functions of the device that may be performed by a processor unit contained within the device. Additionally, in accordance with an aspect of the invention, at least one of the menu features permits the user to mark a waypoint. Upon activation of an appropriate input on the GPS receiver device, the user is permitted to mark a waypoint in a conventional manner. However, in accordance with an aspect of the invention, when marking a waypoint, the display screen displays animated representation of an individual kneeling down and planting a flag along with navigation data indicative of the geographic location at which the waypoint is being marked. Furthermore, the invention permits the user to alpha numerically name the waypoints.

Accordingly, the present invention provides a device and method for displaying animated navigation information on the display of a navigation unit. It should be understood and appreciated that the frame sequences stored in memory may actually be stored at a central processing unit, and transmitted to the unit via a wireless communications link for display on the display.

BRIEF DESCRIPTION OF THE DRAWINGS

The present invention is described in detail below with reference to the attached drawings, wherein:

FIG. 5 is a view of the menu display of the present invention;

FIG. 6 is a display of a secondary animation presented upon selection of the "mark" option of the menu shown in FIG. 5;

FIG. 7 is a series of display panels illustrating various views of the animated object represented the user; and FIG. 8 is a block diagram of the motion detection logic of the device of the present invention.

DETAILED DESCRIPTION OF THE PREFERRED EMBODIMENTS

For a better understanding of the present invention, reference may be had to the following detailed description taken in conjunction with the appended claims and accompanying drawings. In essence, the present invention provides a GPS receiver unit that displays graphic animation that is meaningful to the device user. This is accomplished in several ways including, an indication of the animation employed by the device displayed upon power-up of the device, indications regarding the status of satellite signal acquisition, and a graphic menu driven interface for carrying out various functions of the device. These animations are discussed in more detail below, although the invention is not limited to such examples.

In the broadest form of the invention, an animated character or object is provided to correspond to actual use of the device by the user. For example, in a preferred embodiment, animation is realized through an animated character in a general human form, which has movable arms and legs (for instance) to indicate movement. However, it is contemplated that the animated character may take on a different form, such as a vehicle with wheels that move, or which has a visible exhaust when the vehicle is in motion. Correspondingly, when the character or vehicle is stopped, the arms and legs of the character stop motion, or vehicle wheels do not move or there is no exhaust plume, as the case may be. The appearance of movement is created by presenting a succession of animation frames (that are stored in the memory unit or transmitted to the device via a wireless network) on the display.

Referring initially to FIG. I of the accompanying drawings, a GPS receiver unit 10 is illustrated. The components and characteristics of GPS receiver units are known and, therefore, will only be generally described herein. Unit 10 has a plurality of input buttons 12 and a display panel 14, and a portable housing 16.

Figure 1:
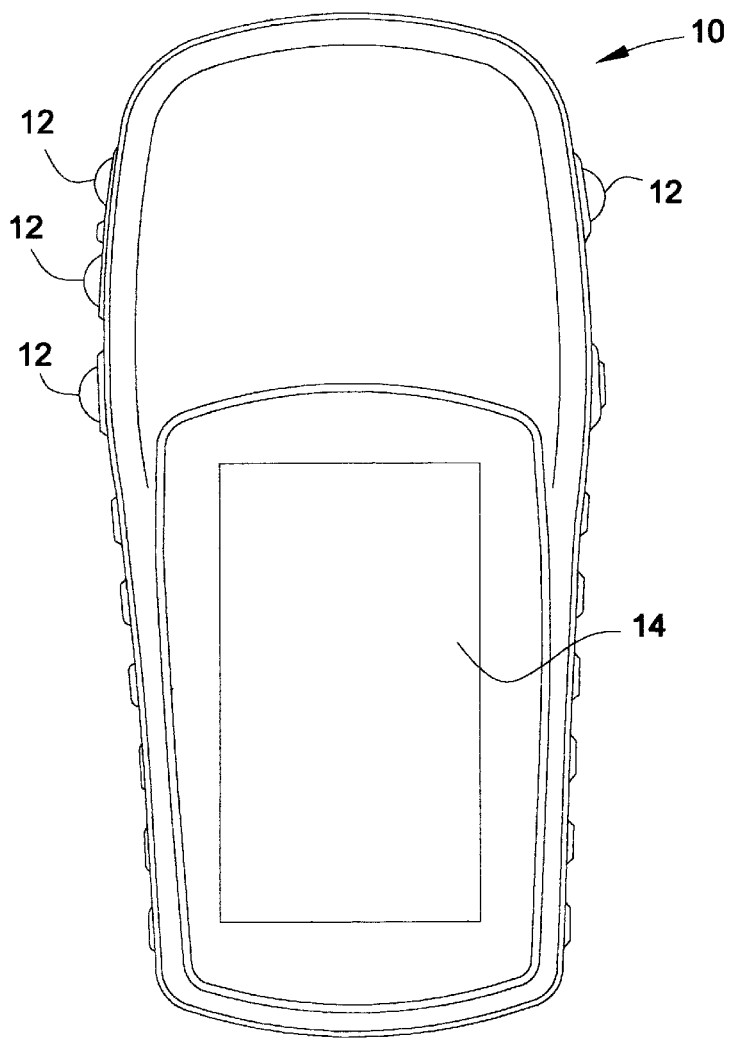
FIG. 1 is a front elevational view of the device of the present invention.
Figure 2:
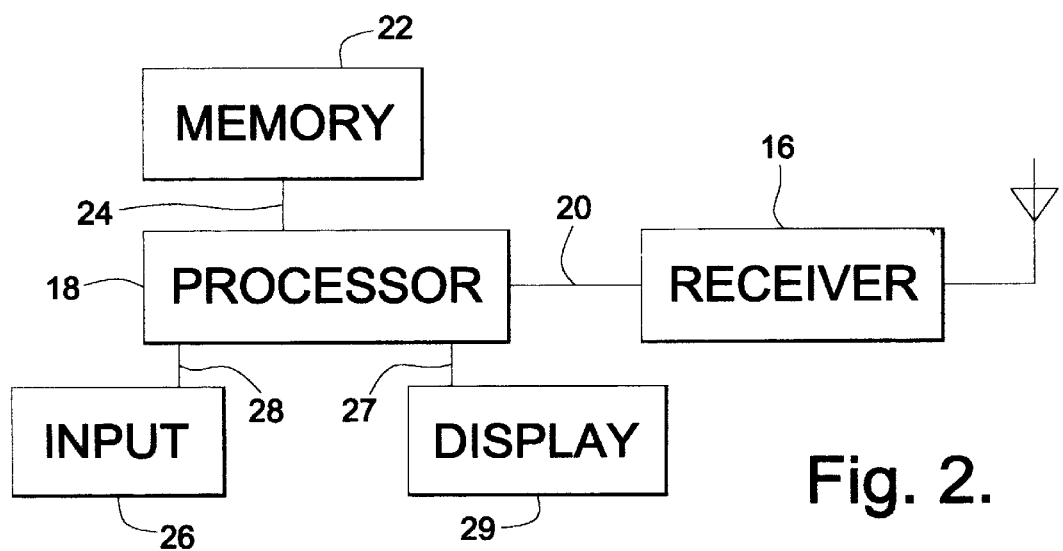
FIG. 2 is a block diagram of the typical components in a GPS receiving device.

FIG. 2 illustrates the electronic components of unit 10. A receiver unit 16 receives data via radio signals transmitted from GPS satellites and transmits the data to a processor unit 18 via a data line 20. Processor unit 18 is linked to a memory unit 22 by data line 24. Memory unit 22 stores data such as data from the GPS satellites, graphic animation and/or electronic map data. Processor 18 is adapted to receive and manipulate data entered by the user through input unit 26 via data line 28. Finally, display unit 29 is linked to and displays data retrieved by processor 18 from memory 22 via data link 27. The electronic circuitry is powered by a power source (not shown) in a conventional manner.

Figure 3:
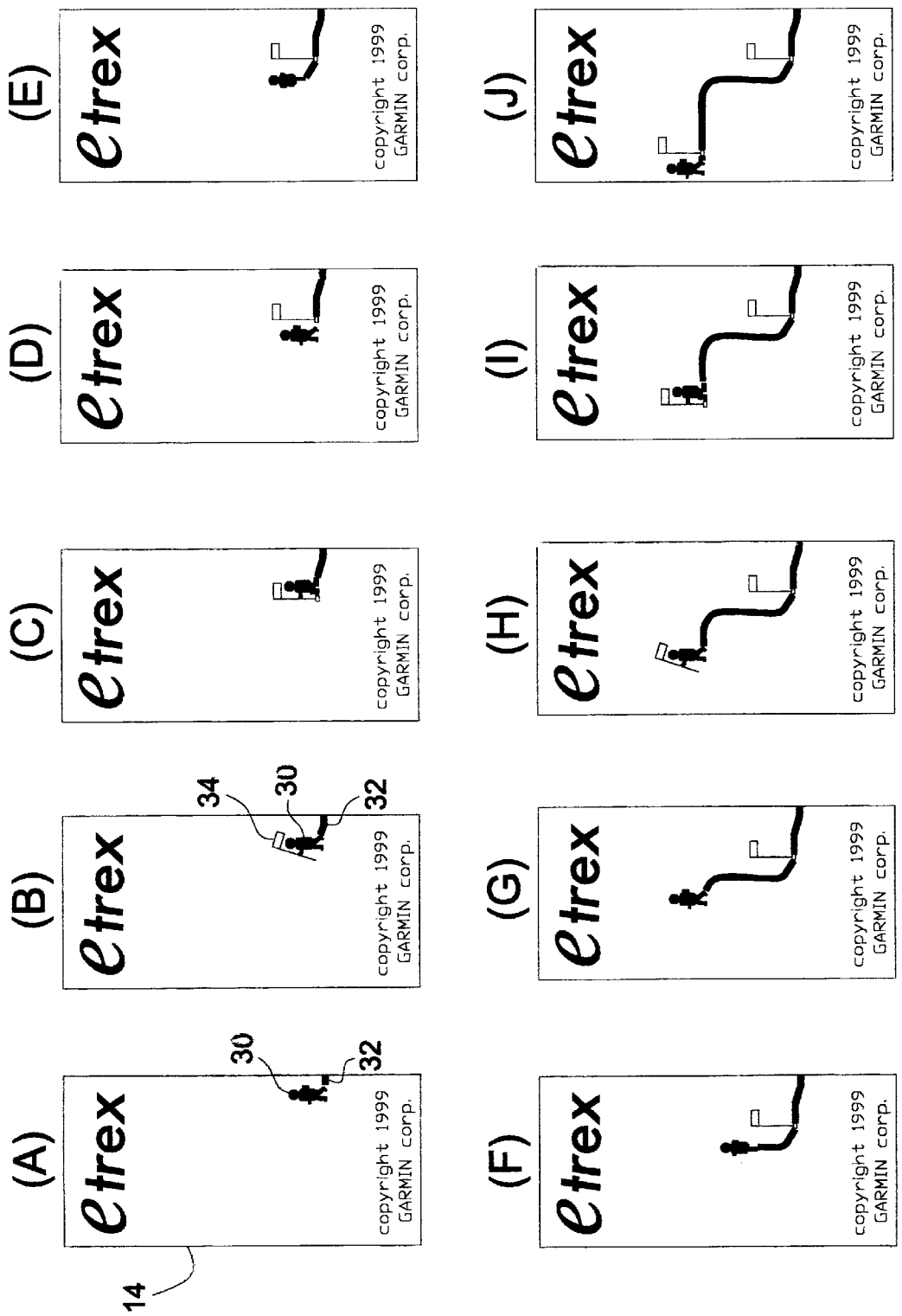
FIG. 3 is a series of frames of the display that are presented upon power up of the device of the present invention.

FIG. 3 illustrates one arrangement of animation contemplated by the present invention. In a preferred embodiment, upon power-up of the device, display 14 presents a screen having at the top a logo and at the bottom a copyright notice. An animation of a person 30 enters the display and plants a flag 34. Those familiar with GPS technology will readily understand that person 30 represents the user or the device and that flag 34 represents a marker or waypoint. Person 30 gives the appearance of action by the presentation of successive frames wherein the arms and legs of person 30 are alternated and the profile is changed, depending upon the direction of movement of the user. When planting flag 34, person 30 lowers flag 34 to the ground and kneels. As illustrated in FIGS. 3(d)–(g), after planting flag 34, person 30 continues across display 14. A trail 32 marks the path traveled by person 30. Shown in FIGS. 3(h)–(i), a second flag 34 is planted and person continues off display 14. Accordingly, each of the frames 14(a)–14(j) are retrieved in sequence from memory 22, for display on display. The rapid retrieval of these frames for display on the display creates a fluid, animated visualization to the user. As will be understood, the number of frames illustrated in FIG. 3 is for illustrative purposes only and, preferably, a great deal more frames are provided such that the presentation is extremely fluid.

Figure 4:
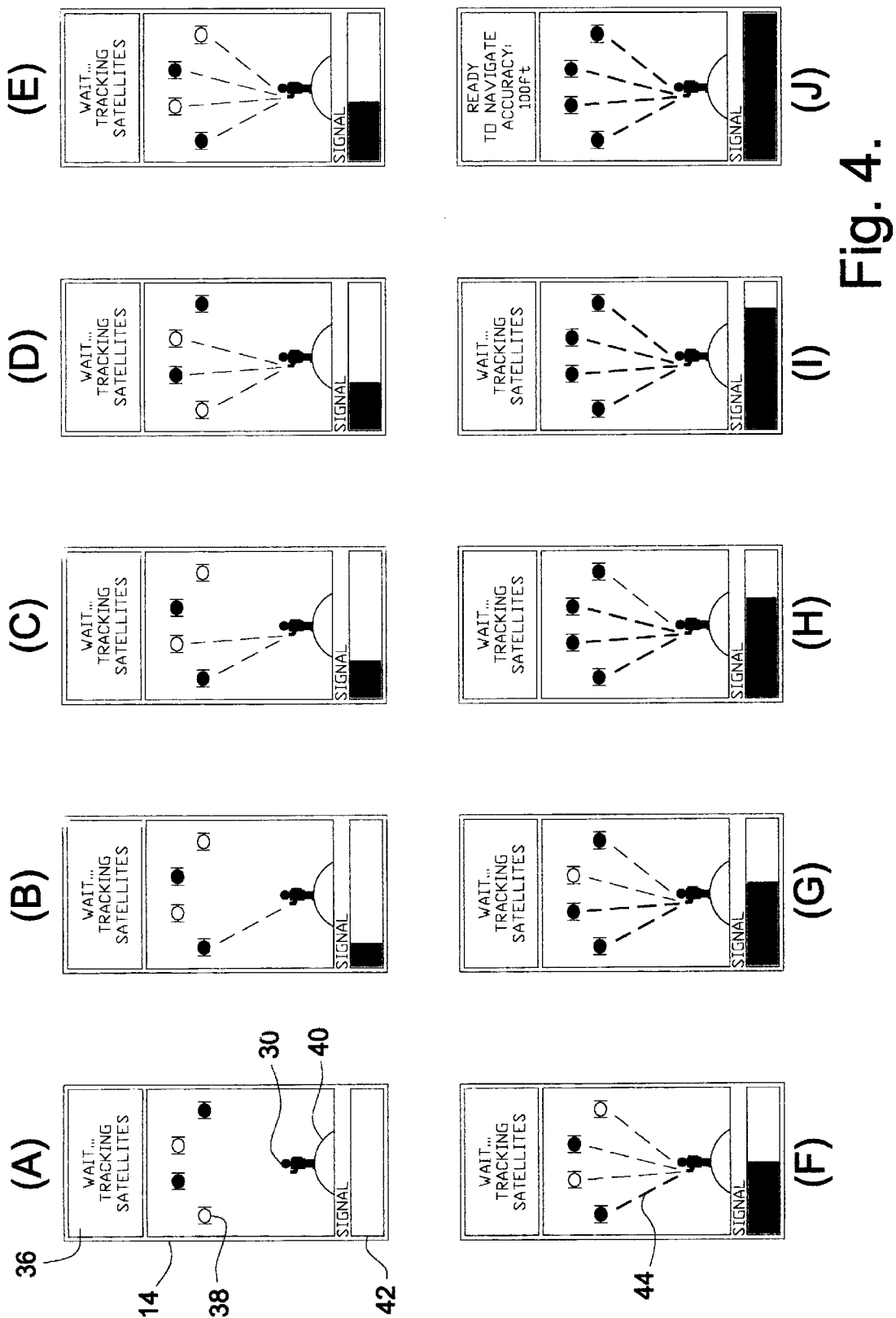
FIG. 4 is a series of display panels presented when the device of the present invention tracks and engages satellites.

FIG. 4 illustrates a series of screens presented on display 14 at the conclusion of the animation shown in FIG. 3. The animations presented in FIG. 4 denote tracking and signal acquisition of GPS satellites by unit 10. This information is useful for indicating to the user when a sufficient number of satellites have been engaged to begin navigation. Stored in memory unit 22 is animation representing a plurality of satellites 38 presented above person 30 who is standing on the Earth 40 and is holding unit 10. A signal strength indicator 42 is presented at the bottom of display 14, in a bottom window. It will be appreciated by those skilled in the relevant art that the GPS receiver unit 10 must acquire spread spectrum GPS satellite signals from at least three satellites for the GPS receiver unit 10 to calculate its two-dimensional position by triangulation. Acquisition of an additional signal, resulting in signals from a total of four satellites, permitsGPS receiver unit 10 to calculate its three-dimensional position. At the top of the screen in a top window, a status message 36 is presented.

As shown in FIGS. 4(a)–(e), during the satellite signal acquisition process, the color or shade of satellites 38 toggle to indicate that unit 10 is in a tracking mode and a shadow line 44 is provided between a satellite 38 and person 30. Once all of the displayed satellites 38 are located, unit 10 proceeds to lock onto the signal. When a signal is acquired, the shadow line 44 darkens to inform the user of the new signal status. As shown in FIG. 4 (j), once all four satellites 38 are fully engaged, the signal strength indicator 42 is fill and status indicator 36 alerts the user that unit 10 is ready to navigate.

Accordingly, as processor 18 locates, and subsequently locks onto, respective satellite signals, the display is updated to display the next successive frame in the sequence. Thus, at the beginning of the satellite acquisition, frame 4(a) is displayed. Upon locating a first satellite, frame 4(b) is displayed. Upon locating a second satellite, frame 4(c) is displayed. Upon locating a third satellite, frame 4(d) is displayed. Upon locating a fourth satellite, frame 4(e) is displayed. Subsequently, once an actual lock is made with the respective satellite signal, frames 4(f)–(j) are displayed. It should be understood and appreciated that this animation sequence may correspond directly with actual satellite tracking and acquisition or, alternatively, may simply be metered out to the display over the time duration associated with the satellite signal acquisition. Additionally, it will be understood and appreciated that many more than four satellites may in fact be acquired, even though the graphical display visualizes only four for illustration purposes.

Customary uses for GPS receiver units include planning travel routes and providing precise location information of the user. To assist the user in utilizing features of unit 10, the present invention includes a graphic menu depicting several functions of the device that can be accessed by the user. FIG. 5 illustrates the preferred menu that presents a title bar 46, graphic representations and labels for options 48, and a display area 50 for presenting other information.

Selection of a particular option can be made through input buttons 12, by use of touch screen activation, or other known methods. These methods are well known and, as such, will not be further discussed. Upon selection of an option 48, additional secondary animation is presented on display 14. FIG. 6 is exemplary of the secondary animation displayed upon selection of the "mark" option 48 shown in the menu of FIG. 5.

FIG. 6 illustrates a display screen illustrated when the user elects to mark a waypoint. In particular, FIG. 6 presents a person 52 kneeling to plant a flag 54. The banner portion 56 of flag 54 includes a graphic representation of the object that the way point to be marked by flag 54 represents. For example, banner 56 illustrated in FIG. 6 includes a graphic representation of a house and the word "home" to indicate that flag 54 is a way point for the user's home. Other graphic representations such as a restaurant, gas station or a bank may appear in banner 56, depending upon whether memory unit 22 associates a particular meaning to the geographic location, or by user selection or entry of an appropriate banner. As seen in FIG. 6, display area 50 provides the coordinates of the position to be marked by flag 54.

The device can also be used to track realtime movement of the user. Referring to FIG. 7(a), there is shown person 130 in a stationary position indicating that the user (and GPS device) is not in motion. FIGS. 7(b)–(c) show real-time movement of person 130. As described above, movement of person 130 is represented by movement of the arms and legs of person 130. A shadow line trail 132 depicts the path traveled by person 130. In particular, when a user is standing still or, particularly, when the GPS device 10 has determined that the device is not moving faster than a lower threshold speed, frame 136(a), indicative of a non-moving individual, is retrieved from memory and displayed on the display. However, once the user begins moving and, particularly, begins moving at a pace faster than a selected rate, the display screen toggles between frames 136(b) and (c) to indicate movement. The display includes a directional indicator 134 and cartographic scale 136. To increase the "real" look and feel of the display, movement of person 130 can correspond to the rate of the user's movement, i.e. the arms and legs of person 130 move faster as the user moves faster.

FIG. 8 is a block diagram that illustrates the logic of such a feature that is carried out by the components of unit 10. At selected intervals, processor 18 will query whether movement of unit 10 is detected, as indicated at step 140. If no movement is detected, a display such as the display shown in FIG. 7(a) is presented, as indicated at step 142. If movement is detected, the screen will toggle between the displays shown in FIGS. 7(b) and 7(c), as indicated at step 144. In one embodiment, changes in the unit's speed of travel will result in corresponding changes in toggling between person 130 movement display screens.

In the foregoing specification, the present invention has been described with reference to specific exemplary embodiments thereof. The invention is considered to have been described in such full, clear, concise and exact terms as to enable a person of ordinary skill in the art to make and use the same. It will be apparent to those skilled in the art, that a person understanding this invention may conceive of changes or other embodiments or variations, which utilize the principles of this invention without departing from the broader spirit and scope of the invention as'set forth in the appended claims. All are considered with the sphere, spirit and scope of the invention. The specification and drawings are, therefore, to be regarded in an illustrative rather than restrictive sense. Accordingly, it is not intended that the invention be limited except as may be necessary in view of the appended claims or their equivalents, which particularly point out and distinctly claim the subject matter applicant regards as the invention.

What is claimed is:

1. A portable electronic device comprising:
   a receiver for receiving wirelessly transmitted signals;
   a processor unit connected to said receiver;
   a memory unit, for storing data, connected to said processor;
   an input connected to said processor; and
   a display, wherein data indicative of an animated object is stored in said memory unit, wherein said animated object is displayed on said display and presents the appearance of motion when said device is in motion.

2. The device as set forth in claim 1, wherein said object corresponds to a location of a user of said device.

3. The device as set forth in claim 1, wherein the appearance of said motion corresponds to the movement of a user of said device.

4. A method of displaying information on a display of a navigation device, said method comprising:
   storing animated data indicative of use of the navigation device in a memory of the navigation device;
   determining when said navigation device is in motion, retrieving said animation information from said memory and outputting it on a display of the navigation device, wherein said animation thereto has at least two features which move relative to each other.

5. The device as set forth in claim 4, wherein said method further comprising determining the location of said navigation device; determining motion of said navigation device; and corresponding said output to said display of said animation information with said motion.

6. A portable electronic device comprising:
   a GPS receiver for determining position information associated with said device;
   a display for displaying an object indicative of a location of the device, wherein said object is animated in that it has at least two features, wherein said features appear to move relative to each other corresponding to movement of said device.

7. The device as set forth in claim 6, wherein said object is indicative of a person, wherein said features comprise arms.

8. The device as set forth in claim 6, wherein said object is indicative of a person wherein said features comprise legs.

9. The device as set forth in claim 6, wherein said object is indicative of a person, wherein said features comprise arms and legs.

10. A portable electronic device comprising:
    receiver for receiving wirelessly transmitted signals;
    a processor unit connected to said receiver;
    a memory unit, for storing data, connected to said processor;
    an input connected to said processor; and
    a display, wherein data indicative of an animated object is stored in said memory unit; wherein said animated object is displayed on said display and presents the appearance of motion when said device is in motion, wherein the appearance of said motion corresponds to movement of a user of said device.

11. A portable electronic device comprising:
    a GPS receiver for determining position information associated with said device;

a display for displaying an object indicative of a location of the device, wherein said object resembles a person and is animated in that it has at least one feature which corresponds to a bodily extremity of the person and which appears to move in correspondence with movement of said device.

* * * * *